United States Patent
Whig et al.

(10) Patent No.: US 11,750,724 B2
(45) Date of Patent: Sep. 5, 2023

(54) TECHNOLOGIES FOR DYNAMIC TELEMATICS MESSAGE PARSING

(71) Applicant: CALAMP CORP., Irvine, CA (US)

(72) Inventors: Manu Whig, Gaithersburg, MD (US); Yashasvi Yadav, Herndon, VA (US); Anand Rau, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

(21) Appl. No.: 17/578,822

(22) Filed: Jan. 19, 2022

(65) Prior Publication Data

US 2023/0231936 A1 Jul. 20, 2023

(51) Int. Cl.
*H04L 69/22* (2022.01)
*H04W 4/44* (2018.01)
*H04W 4/12* (2009.01)

(52) U.S. Cl.
CPC ........... *H04L 69/22* (2013.01); *H04W 4/12* (2013.01); *H04W 4/44* (2018.02)

(58) Field of Classification Search
CPC .......... H04L 69/22; H04W 4/12; H04W 4/44
See application file for complete search history.

(56) References Cited

U.S. PATENT DOCUMENTS

| 7,245,216 B2 * | 7/2007 | Burkley ............... H04W 4/024 340/8.1 |
| 2012/0028635 A1 * | 2/2012 | Borg .................. G06Q 10/0631 455/423 |
| 2018/0253364 A1 * | 9/2018 | Dutta ...................... H04L 43/50 |
| 2019/0141156 A1 * | 5/2019 | Srinivasulu ............. H04W 4/44 |
| 2020/0028946 A1 * | 1/2020 | Vora ...................... H04L 1/1874 |
| 2022/0311640 A1 * | 9/2022 | Geertsema ........ H04L 12/40104 |

* cited by examiner

Primary Examiner — Tonia L Dollinger
Assistant Examiner — Mehulkumar J Shah
(74) Attorney, Agent, or Firm — Barnes & Thornburg LLP

(57) ABSTRACT

Technologies for dynamic telematics message parsing include a telematics cloud server that receives a message definition and generates a dynamic message parser based on the message definition. The message definition may be a binary structure definition. A telematics device receives a message data payload from a peripheral device of a vehicle and then transmits a device message including the message data payload to the cloud server. The peripheral device may include a sensor or a controller coupled to the vehicle. The cloud server executes the dynamic message parser with the message data payload and generates a standardized data structure. The standardized data structure may be processed using a telematics cloud platform. Other embodiments are described and claimed.

16 Claims, 4 Drawing Sheets

TECHNOLOGIES FOR DYNAMIC TELEMATICS MESSAGE PARSING

BACKGROUND

Telematics involves the integrated use of telecommunications and informatics, particularly for application in vehicles. Telematics functionality may include, but is not limited to, recording vehicle information, emergency warning systems, navigation functionality, safety warnings, and automated driving assistance. Vehicle telematics devices may process and transmit telematics data and other messages generated by a vehicle and connected devices. Such vehicles may include multiple sensors, controllers, and other peripheral devices that are produced by multiple third-party manufacturers. Typical vehicle telematics devices include device firmware that is pre-programmed for each type of third-party peripheral device that may be used with the telematics device.

SUMMARY

According to one aspect of the disclosure, a computing device for telematics message processing includes a configuration interface, a parser manager, a message processor, and a data adapter. The configuration interface is to receive a message definition indicative of a binary message format. The parser manager is to generate a dynamic message parser as a function of the message definition. The message processor is to receive a device message from a vehicle telematics device, wherein the device message comprises a message code and a message data payload, and execute the dynamic message parser with the message data payload in response to generation of the dynamic message parser. The data adapter is to generate a standardized data structure as a function of the message data payload in response to execution of the dynamic message parser.

In an embodiment, the parser manager is further to deploy the dynamic message parser in response to the generation of the dynamic message parser, wherein to deploy the dynamic message parser comprises to associate the dynamic message parser with a predetermined message code. In an embodiment, the message processor is further to identify the dynamic message parser based on the message code of the device message in response to deployment of the dynamic message parser, wherein to execute the dynamic message parser comprises to execute the dynamic message parser in response to identification of the dynamic message parser.

In an embodiment, to receive the message definition comprises to receive the message definition from a remote computing device. In an embodiment, the binary message format comprises a binary structure definition. In an embodiment, the message data payload is generated by a vehicle, a vehicle controller, or a sensor coupled to a vehicle.

In an embodiment, to execute the dynamic message parser comprises to extract a first data item from the message data payload. In an embodiment, to execute the dynamic message parser comprises to determine a first label associated with the first data item. In an embodiment, to generate the standardized data structure comprises to generate the standardized data structure that includes the first data item and the first label. In an embodiment, to execute the dynamic message parser further comprises to convert the first data item to a second data item using a predetermined data conversion operation. In an embodiment, to generate the standardized data structure comprises to generate the standardized data structure that includes the second data item and the first label.

In an embodiment, the computing device further includes a cloud telematics platform to process the standardized data structure. In an embodiment, to process the standardized data structure comprises to provide the standardized data structure to a cloud application executed by the cloud telematics platform.

In an embodiment, the standardized data structure comprises a text-based format. In an embodiment, the standardized data structure comprises a JavaScript object notation (JSON) format or an extensible markup language (XML) format. In an embodiment, the standardized data structure conforms to a predetermined vehicle telematics schema associated with a cloud telematics platform.

According to another aspect, a method for telematics message processing includes receiving, by a computing device, a message definition indicative of a binary message format; generating, by the computing device, a dynamic message parser as a function of the message definition; receiving, by the computing device, a device message from a vehicle telematics device, wherein the device message comprises a message code and a message data payload; executing, by the computing device, the dynamic message parser with the message data payload in response to generating the dynamic message parser; and generating, by the computing device, a standardized data structure as a function of the message data payload in response to executing the dynamic message parser.

In an embodiment, the method further includes comprising deploying, by the computing device, the dynamic message parser in response to generating the dynamic message parser, wherein deploying the dynamic message parser comprises associating the dynamic message parser with a predetermined message code. In an embodiment, the method further includes identifying, by the computing device, the dynamic message parser based on the message code of the device message in response to deploying the dynamic message parser, wherein executing the dynamic message parser comprises executing the dynamic message parser in response to identifying the dynamic message parser.

In an embodiment, receiving the message definition comprises receiving the message definition from a remote computing device. In an embodiment, the binary message format comprises a binary structure definition. In an embodiment, the message data payload is generated by a vehicle, a vehicle controller, or a sensor coupled to a vehicle.

In an embodiment, executing the dynamic message parser comprises extracting a first data item from the message data payload. In an embodiment, executing the dynamic message parser comprises determining a first label associated with the first data item. In an embodiment, generating the standardized data structure comprises generating the standardized data structure that includes the first data item and the first label. In an embodiment, executing the dynamic message parser further comprises converting the first data item to a second data item using a predetermined data conversion operation. In an embodiment, generating the standardized data structure comprises generating the standardized data structure that includes the second data item and the first label.

In an embodiment, the method further includes processing, by the computing device, the standardized data structure using a cloud telematics platform. In an embodiment, processing the standardized data structure comprises providing the standardized data structure to a cloud application executed by the cloud telematics platform.

In an embodiment, the standardized data structure comprises a text-based format. In an embodiment, the standardized data structure comprises a JavaScript object notation (JSON) format or an extensible markup language (XML) format. In an embodiment, the standardized data structure conforms to a predetermined vehicle telematics schema associated with a cloud telematics platform.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
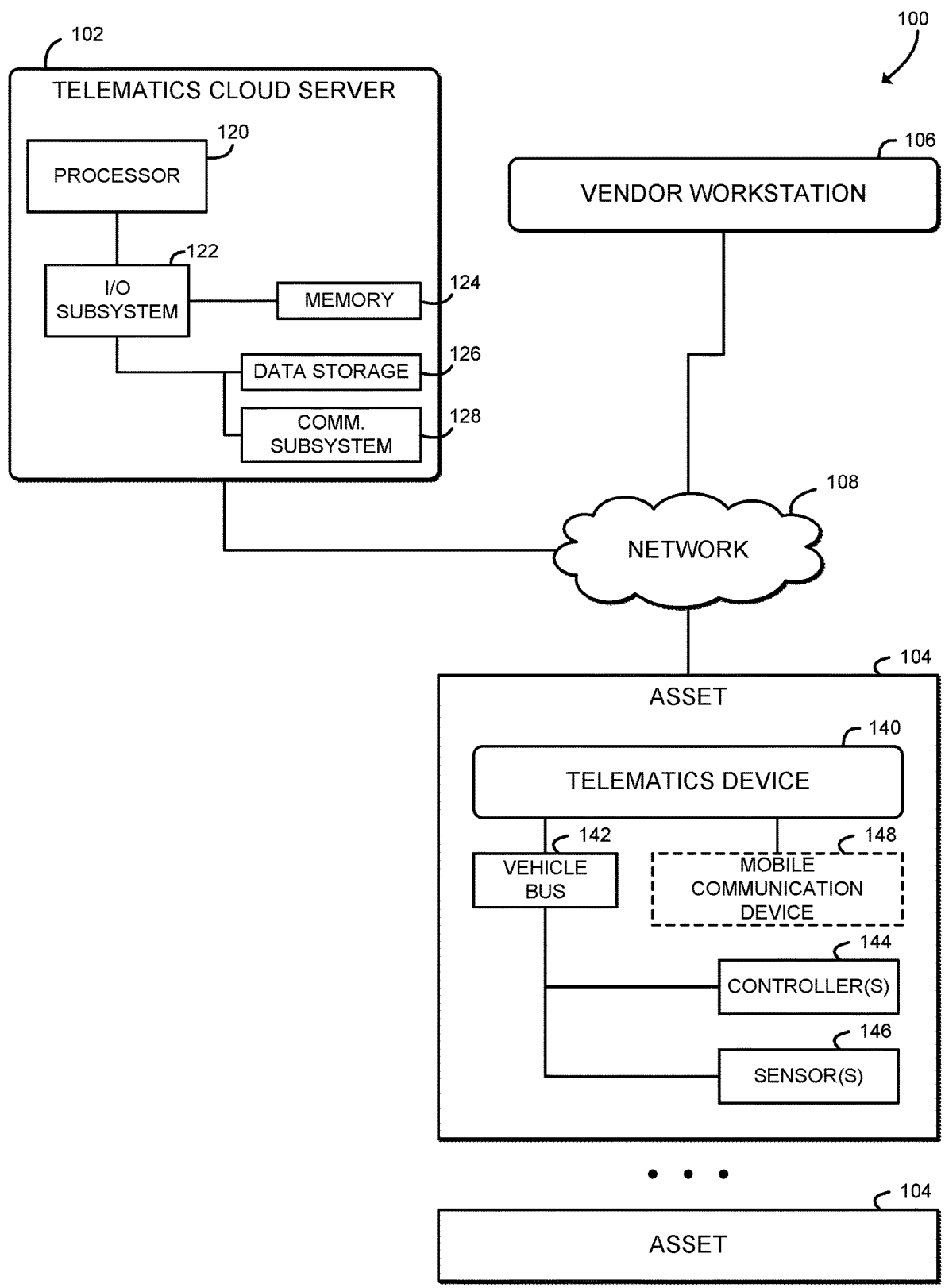
FIG. 1 is a simplified block diagram of at least one embodiment of a system for dynamic telematics messaging.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C); (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for dynamic telematics message parsing includes a telematics cloud server 102, which may be in communication with multiple assets 104 and vendor workstations 106 over a network 108. In use, as described further below, the telematics cloud server 102 receives a message definition from a vendor workstation 106 and then generates a corresponding dynamic message parser. A telematics device 140 coupled to an asset 104 sends one or more messages including telematics data to the telematics cloud server 102, and the telematics cloud server 102 executes the dynamic message parser to parse the messages and process the corresponding message data. Accordingly, the system 100 may process messages from multiple peripheral devices from different vendors without modifying application programming interface (API) code on the telematics cloud server 102. Accordingly, the telematics cloud server 102 may support many different sensors or other peripheral devices from multiple vendors without requiring custom code for each specific peripheral device. Thus, integration time may be reduced, which may reduce costs and/or increase capabilities of applications built with the telematics cloud server 102.

The telematics cloud server 102 may be embodied as any type of device capable of performing the functions described herein. For example, the telematics cloud server 102 may be embodied as, without limitation, a server, a rack-mounted server, a blade server, a workstation, a network appliance, a web appliance, a desktop computer, a laptop computer, a tablet computer, a smartphone, a consumer electronic device, a distributed computing system, a multiprocessor system, and/or any other computing device capable of performing the functions described herein. Additionally, in some embodiments, the telematics cloud server 102 may be embodied as a "virtual server" formed from multiple computing devices distributed across the network 108 and operating in a public or private cloud. Accordingly, although the telematics cloud server 102 is illustrated in FIG. 1 as embodied as a single computing device, it should be appreciated that the telematics cloud server 102 may be embodied as multiple devices cooperating together to facilitate the functionality described below. As shown in FIG. 1, the illustrative telematics cloud server 102 includes a processor 120, an I/O subsystem 122, memory 124, a data storage device 126, and a communication subsystem 128. Of course, the telematics cloud server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the telematics cloud server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the telematics cloud server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the telematics cloud server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the telematics cloud server 102 may be embodied as any communication circuit, device, or collection thereof, capable of enabling communications between the telematics cloud server 102, the telematics device 140, the vendor workstation 106, and/or other remote devices. The communication subsystem 128 may be configured to use any one or more communication technology (e.g., wireless or wired communications) and associated protocols (e.g., Ethernet, Bluetooth®, Bluetooth Low Energy (BLE), WiMAX, 3G LTE, 5G, etc.) to effect such communication.

Each asset 104 may be embodied as a vehicle, such as a heavy truck, a fleet vehicle, a garbage truck, a snow plow, a dump truck, a bus, a light truck, a passenger car, an airplane, a water craft, or other vehicle. Additionally or alternatively, each asset 104 may be embodied as a shipping pallet, a tool cage, a restricted access room, a section of the warehouse, or any other device or location that may be monitored or tracked using a telematics device 140. As shown, each asset 104 includes or is otherwise coupled to a telematics device 140. The telematics device 140 is configured to monitor the location and/or condition of the asset 104. Illustratively, the asset 104 is a vehicle, and the telematics device 140 is configured to monitor operating conditions of the asset 104 and to communicate telematics data indicative of the operating conditions of the asset 104 to the telematics cloud server 102. The telematics device 140 may be embodied as any type of computation or computer device capable of performing the functions described herein, including, without limitation, a mobile computing device, an embedded device, a computer, a laptop computer, a notebook computer, a tablet computer, a wearable computing device, a multi-processor system, a network appliance, a distributed computing system, a processor-based system, and/or a consumer electronic device. Thus, the telematics device 140 includes components and devices commonly found in a computer or similar computing device, such as a processor, an I/O subsystem, a memory, a data storage device, and/or communication circuitry. Those individual components of the telematics device 140 may be similar to the corresponding components of the telematics cloud server 102, the description of which is applicable to the corresponding components of the telematics device 140 and is not repeated herein so as not to obscure the present disclosure.

As shown, the illustrative asset 104 further includes a vehicle bus 142 that may be coupled to multiple connected devices such as controllers 144 and sensors 146. The vehicle bus 142 may be embodied as a controller area network (CAN) bus, a local area network, a wireless network, or another communications network that allows various components of the asset 104 and/or peripheral devices to communicate. The telematics device 140 is coupled to the vehicle bus 142. In some embodiments, the telematics device 140 may be removably coupled to the vehicle bus 142 using a vehicle diagnostic connector such as an OBD-II port of the asset 104. Additionally or alternatively, the telematics device 140 may be directly connected or otherwise coupled to the vehicle bus 142 with a wiring harness or other connector. Each of the controllers 144 may be embodied as an electronic control unit (ECU), an engine controller, a vehicle controller, a microcontroller, or other embedded computing resource of the asset 104. Each controller 144 may provide engine telemetry, ignition signals, odometer signals, or other vehicle telemetry data over the vehicle bus 142. Each of the sensors 146 may be embodied as a location sensor (e.g., a GPS receiver), a speed sensor, a temperature sensor, an environmental sensor, a weight sensor, a vehicle- or application-specific sensor such as a snow plow position sensor, a fork lift position sensor, a tire pressure sensor, a door state sensor, or other sensor device configured to provide sensor data over the vehicle bus 142. Although illustrated in FIG. 1 as being coupled to the telematics device 140 via the vehicle bus 142, it should be understood that in some embodiments one or more of the controllers 144 and/or the sensors 146 may be coupled directly to the telematics device 140 via Bluetooth Low Energy (BLE), wireless networking (WiFi), a direct serial connection, or other connection.

In some embodiments, the asset 104 may include a mobile communication device 148 coupled to the telematics device 140. The mobile communication device 148 may be embodied as a cellular modem, a smartphone, a cellular telephone, an IoT gateway, an IoT router, or other device that enables communications between the telematics device 140 and one or more remote devices such as the telematics cloud server 102. Additionally or alternatively, in some embodiments the telematics device 140 may include integrated communication circuitry capable of network communication.

Each vendor workstation 106 is configured to provide message definitions to the telematics cloud server 102 and otherwise perform the functions described herein. Thus, each vendor workstation 106 may be embodied as any type of computation or computer device capable of performing the functions described herein, including, without limitation, a computer, a workstation, a server, a rack-mounted server, a blade server, a laptop computer, a notebook computer, a tablet computer, a mobile computing device, a wearable computing device, a multiprocessor system, a network appliance, a web appliance, a distributed computing system, a processor-based system, and/or a consumer electronic device. Thus, each of the vendor workstation 106 includes components and devices commonly found in a computer or similar computing device, such as a processor, an I/O subsystem, a memory, a data storage device, and/or communication circuitry. Those individual components of the vendor workstation 106 may be similar to the corresponding components of the telematics cloud server 102, the description of which is applicable to the corresponding components of the vendor workstation 106 and is not repeated herein so as not to obscure the present disclosure.

As discussed in more detail below, the telematics cloud server 102, the telematics devices 140, and the vendor workstations 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, stations, and switches, to facilitate communications among the devices of the system 100.

Figure 2:
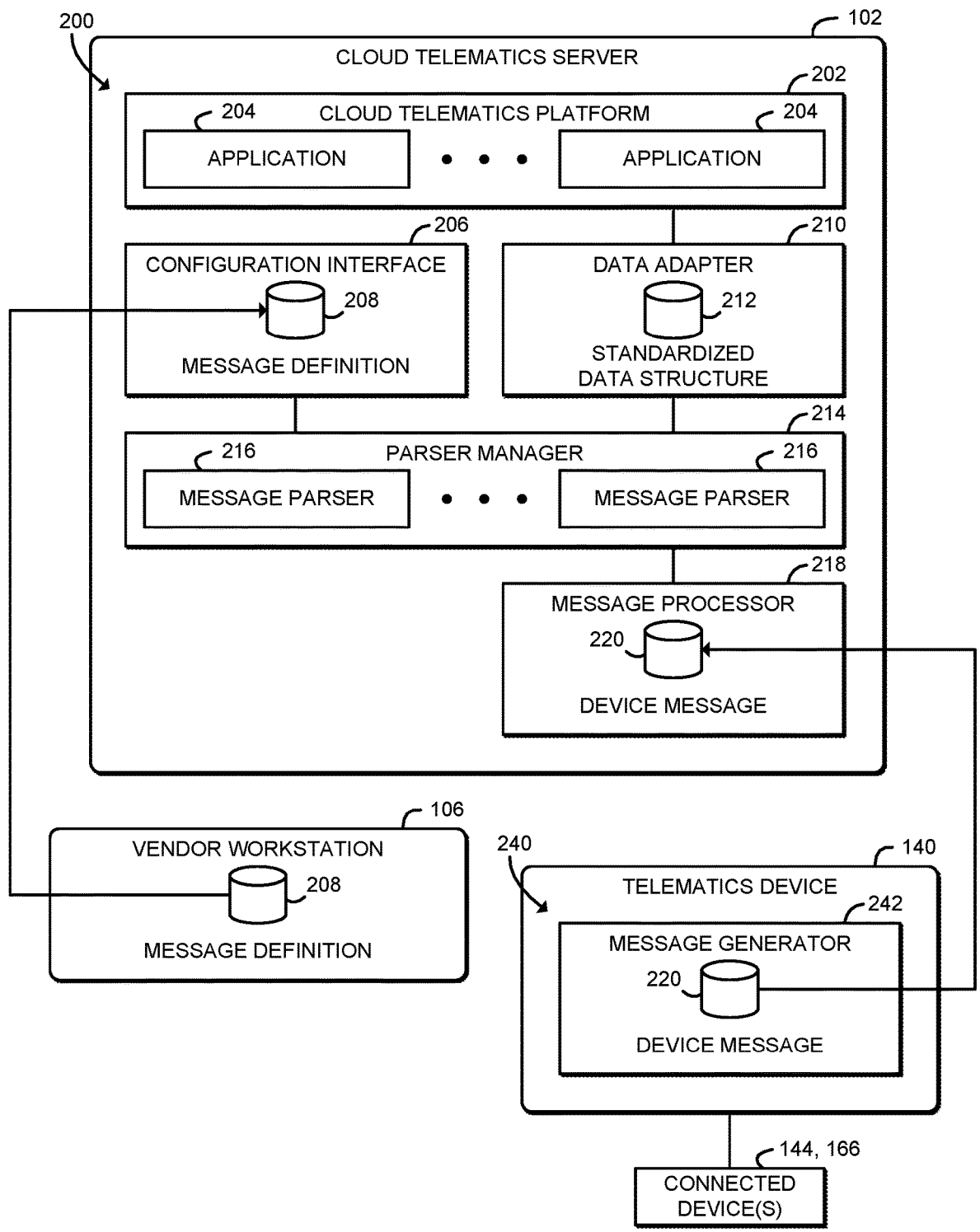
FIG. 2 is a simplified block diagram of various environments that may be established by the system of FIG. 1.

Referring now to FIG. 2, in the illustrative embodiment, the telematics cloud server 102 establishes an environment 200 during operation. The illustrative environment 200 includes a cloud telematics platform 202, a configuration interface 206, a data adapter 210, a parser manager 214, and a message processor 218. The various components of the environment 200 may be embodied as hardware, firmware, software, or a combination thereof. As such, in some embodiments, one or more of the components of the environment 200 may be embodied as circuitry or a collection of electrical devices (e.g., cloud telematics platform circuitry 202, configuration interface 206, data adapter circuitry 210, parser manager circuitry 214, and/or message processor circuitry 218). It should be appreciated that, in such embodiments, one or more of those components may form a portion of the processor 120, the I/O subsystem 122, and/or other components of the telematics cloud server 102.

The configuration interface 206 is configured to receive a message definition 208 indicative of a binary message format. In some embodiments, the binary message format may be embodied as a binary structure definition. The message definition 208 may be received from a remote computing device such as a vendor workstation 106.

The parser manager 214 is configured to generate a dynamic message parser 216 as a function of the message definition 208. The parser manager 214 may be further configured to deploy the dynamic message parser 216 after generation. Deploying the dynamic message parser 216 may include associating the dynamic message parser 216 with a predetermined message code.

The message processor 218 is configured to receive a device message 220 from a vehicle telematics device 140. The device message 220 includes a message code and a message data payload. The message data payload may be generated by an asset 104, a component of the asset 104 such as a controller 144, or a sensor 146 coupled to an asset 104. The message processor 218 is further configured to execute the dynamic message parser 216 with the message data payload in response the dynamic message parser 216 being generated. The message processor 218 may be further configured to identify the dynamic message parser 216 for execution based on the message code of the device message 220. Executing the dynamic message parser 216 may include extracting a data item from the message data payload, determining a label associated with a data item, or converting a data item to another data item using a predetermined data conversion operation.

The data adapter 210 is configured to generate a standardized data structure 212 as a function of the message data payload in response executing the dynamic message parser 216. Generating the standardized data structure 212 may include generating a standardized data structure that includes a data item extracted by the dynamic message parser 216, a label that is determined by the dynamic message parser 216, or another data item that results from a conversion performed by the dynamic message parser 216. The standardized data structure 212 may conform to a predetermined vehicle telematics schema associated with the cloud telematics platform 202. In some embodiments, the standardized data structure 212 may include a text-based format such as a JavaScript object notation (JSON) format or an extensible markup language (XML) format.

The cloud telematics platform 202 may be embodied as a multi-tenant application environment or other cloud application platform. The cloud telematics platform 202 is configured to process the standardized data structure 212. Processing the standardized data structure 212 may include providing the standardized data structure 212 to a cloud application 204 executed by the cloud telematics platform 202.

Referring now to FIG. 2, in the illustrative embodiment, the telematics device 140 establishes an environment 240 during operation. The illustrative environment 240 includes message generator 242. The various components of the environment 240 may be embodied as hardware, firmware, software, or a combination thereof. As such, in some embodiments, one or more of the components of the environment 240 may be embodied as circuitry or a collection of electrical devices (e.g., message generator circuitry 242). It should be appreciated that, in such embodiments, one or more of those components may form a portion of the processor, the I/O subsystem, and/or other components of the telematics device 140.

The message generator 242 is configured to receive messages from a peripheral device coupled to the telematics device 140 such as a controller 144 or a sensor 146 of an asset 104. The message generator 242 is further configured to forward the message received from the peripheral device to the cloud telematics server 102 as the message data payload of a device message 220.

Figure 3:
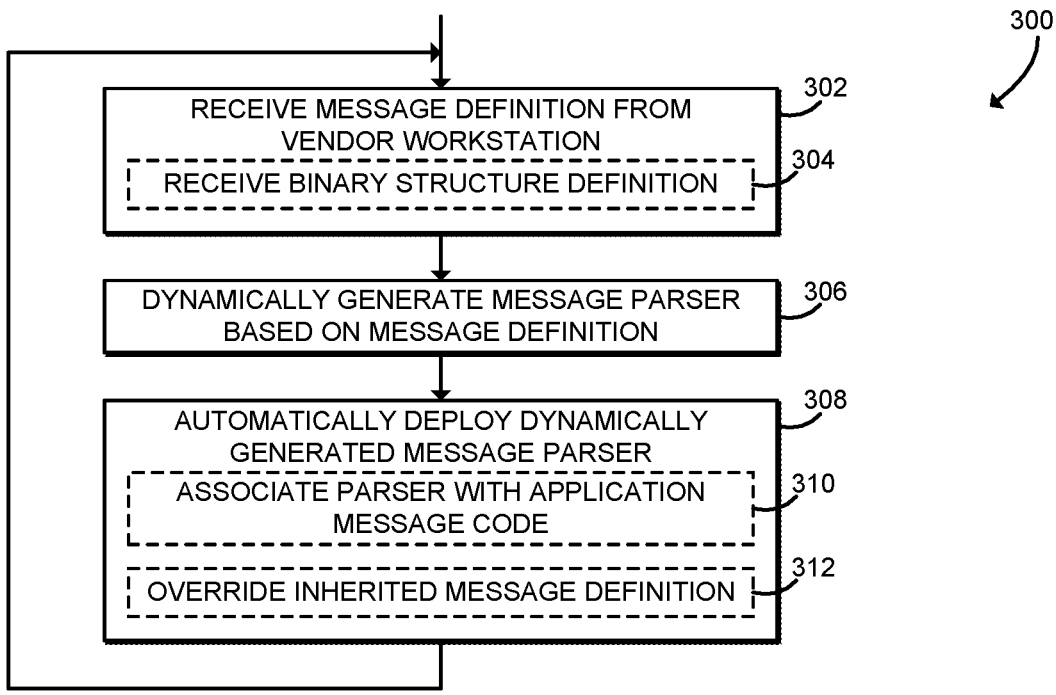
FIG. 3 is a simplified flow diagram of at least one embodiment of a method for generating and deploying a dynamic parser that may be executed by a telematics cloud server of FIGS. 1 and 2.

Referring now to FIG. 3, in use, the telematics cloud server 102 may execute a method 300 for generating and deploying a dynamic parser. It should be appreciated that, in some embodiments, the operations of the method 300 may be performed by one or more components of the environment 200 of the telematics cloud server 102 as shown in FIG. 2. The method 300 begins with block 302, in which the telematics cloud server 102 receives a message definition 208 from a vendor workstation 106. The message definition may be embodied as a declarative description of the format of binary messages generated a peripheral device such as a controller 144, a sensor 146, or another device that may be incorporated in or otherwise coupled to an asset 104 in communication with a telematics device 140. The message definition 208 may be generated by the vendor workstation 106, for example, when deploying or otherwise preparing a peripheral device for use with the cloud telematics platform 202. In some embodiments, in block 304, the telematics cloud server 202 may receive the message definition 208 as a binary structure definition. For example, the message definition 208 may be embodied as a Kaitai Struct file, a .KSY file, or other description of a binary structure format.

In block 306, the telematics cloud server 102 dynamically generates a message parser 216 based on the message definition 208. The message parser 216 may be embodied as executable code, object code, bytecode, a script file, a parser table, or other data that may be executed by the telematics cloud server 102 to parse device messages according to the message definition 208. The message parser 216 is dynamically generated and thus may be loaded and executed at runtime. Accordingly, in some embodiments the message parser 216 may be executed without updating firmware of one or more telematics devices 140.

In block 308, the telematics cloud server 102 automatically deploys the dynamically generated message parser 216. Deploying the dynamically generated message parser 216 allows the cloud server 102 to execute the message parser 216 when processing device messages received from telematics devices 140. The message parser 216 may be deployed on demand (e.g., using just-in-time compilation or other runtime deployment) or using any other deployment strategy. In some embodiments, in block 310 the telematics cloud server 102 may associate the dynamic message parser 216 with a message code. The message code may be a predetermined eight-bit value or other constant, and in some embodiments may be supplied or otherwise specified by the vendor workstation 106. Additionally or alternatively, the message code may be embodied as any predetermined metadata included in the device message and/or extrinsic data associated with the device message such as network port number, network protocol, or other information or characteristics associated with the device message but not included in the device message. As described further below, the telematics cloud server 102 may use the message code to identify a particular dynamic message parser 216 for use in parsing a particular device message. Accordingly, in some embodiments the message parser 216 may be deployed without modifying API code of the telematics cloud server 102. In block 312, the telematics cloud server 102 may override one or more inherited message definitions. For example, the telematics cloud server 102 may override a default definition or other previously provided message definition that matches the name or other identifier of the message definition 208 provided by the developer/vendor workstation 106. In some embodiments, the provided message definition may override a default definition for one or more elements of the message definition (e.g., for one or more indices or other positions in the binary message). After deploying the message parser 216, the method 300 loops back to block 302 to continue processing message definitions 208.

Figure 4:
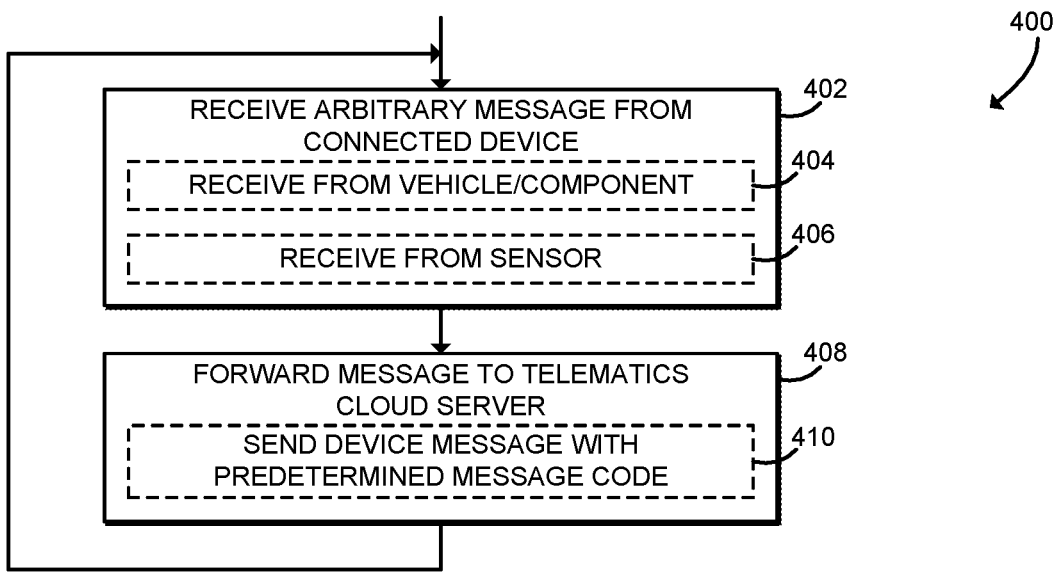
FIG. 4 is a simplified flow diagram of at least one embodiment of a method for processing device messages that may be executed by a telematics device of FIGS. 1 and 2.

Referring now to FIG. 4, in use, a telematics device 140 may execute a method 400 for processing device messages. It should be appreciated that, in some embodiments, the operations of the method 400 may be performed by one or more components of the environment 240 of the telematics device 140 as shown in FIG. 2. The method 400 begins with block 402, in which the telematics device 140 receives an arbitrary message from a connected device. The message may be a binary message or other data and may have an arbitrary message format. As described above, this format of the binary message may be described by a corresponding message definition 208 that is provided to the telematics cloud server 102. The connected device may be a peripheral device of an asset 104 such as a controller 144 or a sensor 146. Accordingly, the message may be received over the vehicle bus 142 or may be received directly from the connected device. In some embodiments, in block 404 the telematics device 140 may receive the message from the asset 104 or from a component of the asset 104 (e.g., a vehicle controller 144). In some embodiments, in block 406 the telematics device 140 may receive the message from a sensor device 146.

In block 408, the telematics device 140 forwards the message to the cloud telematics server 102. The telematics device 140 may transmit the message to the telematics server 102 via the network 108, for example using cellular network connectivity, long-range radio connectivity, or other network communications. The message may be embodied as a user message, an application message, a data packet, or any other message that conforms to the message definition 208 as described above. In some embodiments, in block 410 the telematics device 140 may send the message as a device message 220 with a predetermined message code. As described above, the message code may be a predetermined byte value or other constant, a predetermined metadata element included in the device message, and/or an extrinsic data element associated with the device message such as network port number, network protocol, or other information about or characteristics associated with the device message 220. The binary message received from the connected device may be included in the device message 220 as the message data payload. For example, in an embodiment, the telematics device 140 may send fleet management interface (FMI) messages received from a GPS receiver 146 to the telematics cloud server 102 as user messages. Similarly, in an embodiment, telematics device 140 may send automatic vehicle localization (AVL) sensor data received from other sensors 146 to the telematics cloud server 102 as user messages. The device message 220 is processed by the telematics cloud server 102 as described further below in connection with FIG. 5. After forwarding the message, the method 400 loops back to block 402 to continue processing additional messages from the connected device.

Figure 5:
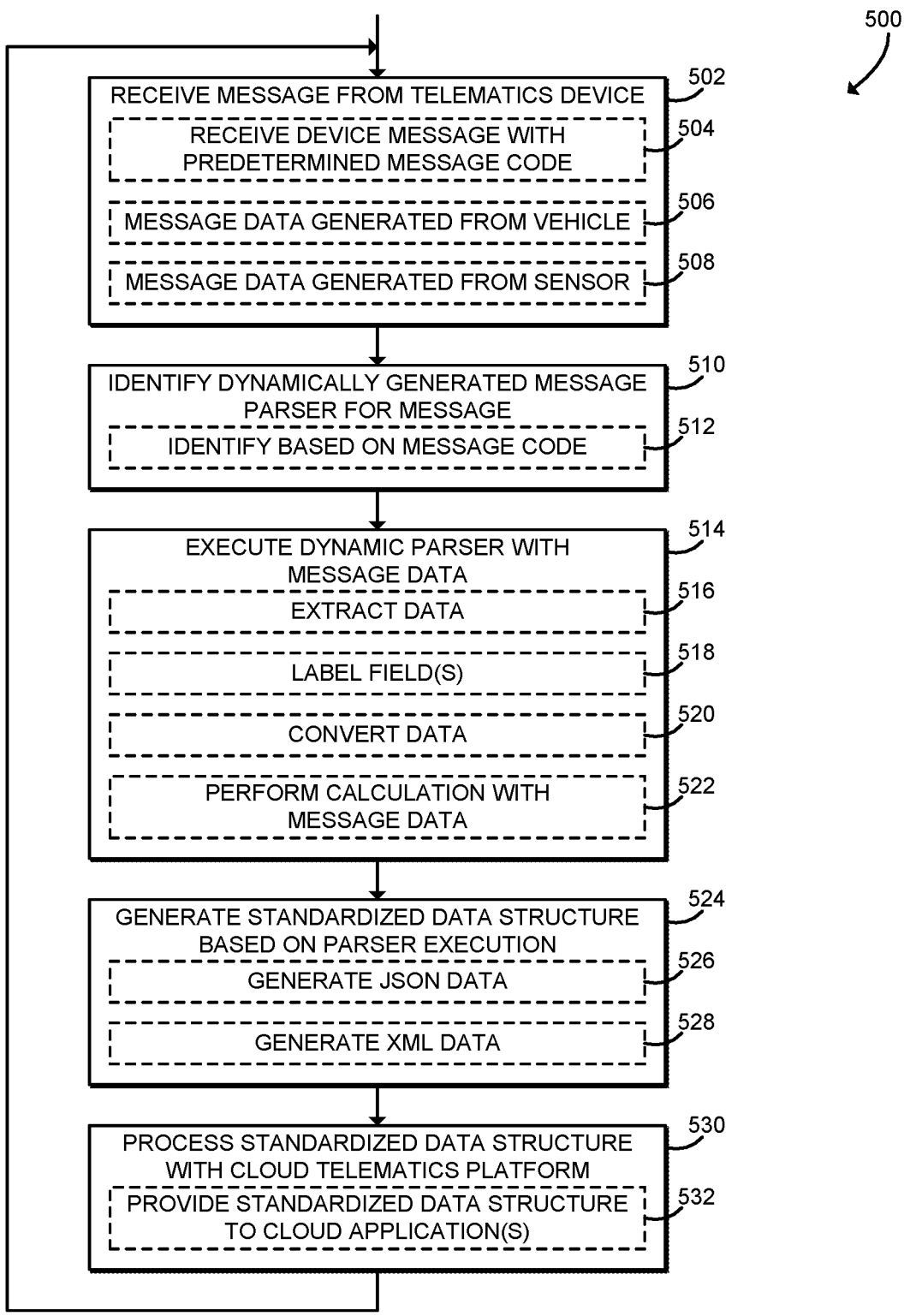
FIG. 5 is a simplified flow diagram of at least one embodiment of a method for dynamically parsing device messages that may be executed by the telematics cloud server of FIGS. 1 and 2.

Referring now to FIG. 5, in use, the telematics cloud server 102 may execute a method 500 for dynamically parsing device messages. It should be appreciated that, in some embodiments, the operations of the method 500 may be performed by one or more components of the environment 200 of the telematics cloud server 102 as shown in FIG. 2. The method 500 begins with block 502, in which the telematics cloud server 102 receives a device message 220 from a telematics device 140. The device message 220 includes a message data payload, which may include vehicle telematics data or other data collected and/or generated by the telematics device 140. In some embodiments, in block 504 the telematics cloud server 102 may receive a device message 220 that includes a predetermined message code. The device message 220 may be embodied as a network message such as a UDP message or other data packet, and the message code may be embodied as an 8-bit field included in a header or at another predetermined location in the device message 220. Of course, in other embodiments the device message 220 may use a different protocol and/or message format. In some embodiments, in block 506, the message data payload included in the device message 220 may be generated by the asset 104 or a component of the asset 104, such as a controller 144. In some embodiments, in block 508, the message data payload included in the device message 220 may be generated by a sensor 146 of the asset 104.

In block 510, the telematics cloud server 102 identifies a dynamically generated message parser 216 to use for parsing the device message 220. The dynamically generated message parser 216 is generated from a message definition 208 as described above in connection with FIG. 3. The telematics cloud server 102 may use any appropriate technique to identify the message parser 216. In some embodiments, in block 512 the telematics cloud server 102 may identify the dynamic message parser 216 based on the message code included in the device message 220. For example, as described above, the message code may be a predetermined byte constant or other predetermined value that is associated with the dynamic message parser 216 during deployment. The telematics cloud server 102 may match the message code against predetermined values associated with multiple dynamic message parsers 216 in order to identify a particular dynamic message parser 216 for use in parsing the device message 220. As another example, the telematics cloud server 102 may identify the dynamically generated message parser 216 by matching a network port number associated with the device message 220 against predetermined port number values associated with multiple dynamic message parsers 216.

In block 514, the telematics cloud server 102 executes the identified dynamic message parser 216 with the message data payload of the device message 220. During execution, the message parser 216 may read one or more data fields from the device message 220, generate one or more labels, perform data conversions, or perform other operations defined by the message definition 208. In some embodiments, in block 516 the message parser 216 executed by the telematics cloud server 102 may extract one or more data items from the message data payload. For example, for each data item the message parser 216 may extract a certain number of bytes, bits, or other data from a predetermined location in the message data payload. The message parser 216 may, for example, extract data in a particular numeric format (e.g., integer, floating point, signed, unsigned, etc.) and/or endianness. As another example, the message parser 216 may extract textual data in a string format and/or encoding (e.g., UTF-8, UTF-16, or other encoding). In some embodiments, in block 518 the message parser 216 executed by the telematics cloud server 102 may label one or more fields or other extracted data items. For example, the message parser 216 may associate one or more predetermined labels, titles, descriptions, offsets, or other metadata with an extracted data item. In some embodiments, in block 520 the message parser 216 executed by the telematics cloud server 102 may convert data between formats, units, or perform other conversions or translations. For example, the message parser 216 may convert a value in one unit (e.g., miles per hour) into another value in a different unit (e.g., kilometers per hour). As another example, the message parser 216 may convert a dimensionless binary value into a distance value in certain units (e.g., miles or kilometers), a speed value in certain units (e.g., miles per hour or kilometers per hour), or perform other conversions. In some embodiments, in block 522 the message parser 216 executed by the telematics cloud server 102 may perform one or more calculations with message data. The message parser 216 may, for example, perform one or more numerical, lexical, logical, or other operations included in the message description 208.

In block 524, the telematics cloud server 102 generates a standardized data structure 212 based on the results of executing the dynamic message parser 216 with the message data payload. For example, the telematics cloud server 102 may generate a standardized data structure 212 that includes data extracted from the message data payload, labels generated by the message parser 216, and/or the results of data conversion or other calculations performed by the dynamic message parser 216. The standardized data structure 212 may be embodied as any data format that may be processed by the cloud telematics platform 202 of the telematics cloud server 102. For example, the standardized data structure 212 may conform to a vehicle telematics schema or other predetermined interface compatible with the cloud telematics platform 202. In some embodiments, in block 526 the telematics cloud server 102 may generate the standardized data structure 212 as a JavaScript object notation (JSON) object. In some embodiments, in block 528 the telematics cloud server 102 may generate the standardized data structure 212 as an extensible markup language (XML) document or other XML data.

In block 530, the telematics cloud server 102 processes the standardized data structure 212 with the cloud telematics platform 202. The telematics cloud server 102 may enrich, log, aggregate, analyze, or otherwise process the telematics data included in the standardized data structure 212. In some embodiments, in block 532 the telematics cloud server 102 may provide the standardized data structure 212 to one or more cloud applications 204 executed in connection with the cloud telematics platform 202. For example, the standardized data structure 212 may be executed by a cloud application 204 provided by a vendor that also provided the message definition 208 associated with the message data payload transmitted by the telematics device 140 (e.g., from a peripheral device such as a controller 144 and/or a sensor 146). After processing the standardized data structure 212, the method 500 loops back to block 502 to continue processing messages from the telematics device 140.

The invention claimed is:

1. A method for telematics message processing, the method comprising:
receiving, by a computing device, a message definition indicative of a binary message format;
generating, by the computing device, a dynamic message parser as a function of the message definition;
deploying, by the computing device, the dynamic message parser in response to generating the dynamic message parser, wherein deploying the dynamic message parser comprises associating the dynamic message parser with a predetermined message code;
receiving, by the computing device, a device message from a vehicle telematics device, wherein the device message comprises a message code and a message data payload;
identifying, by the computing device, the dynamic message parser based on comparing the message code of the device message with the predetermined message code in response to deploying the dynamic message parser;
executing, by the computing device, the dynamic message parser with the message data payload in response to identifying the dynamic message parser; and
generating, by the computing device, a standardized data structure as a function of the message data payload in response to executing the dynamic message parser.

2. The method of claim 1, wherein executing the dynamic message parser comprises extracting a first data item from the message data payload.

3. The method of claim 2, wherein executing the dynamic message parser further comprises converting the first data item to a second data item using a predetermined data conversion operation.

4. A computing device for telematics message processing, the computing device comprising:
- a configuration interface to receive a message definition indicative of a binary message format;
- a parser manager to generate a dynamic message parser as a function of the message definition;
- a message processor to (i) deploy the dynamic message parser in response to generation of the dynamic message parser, wherein to deploy the dynamic message parser comprises to associate the dynamic message parser with a predetermined message code, (ii) receive a device message from a vehicle telematics device, wherein the device message comprises a message code and a message data payload, (iii) identify the dynamic message parser based on a comparison of the message code of the device message with the predetermined message code in response to deployment of the dynamic message parser, and (iv) execute the dynamic message parser with the message data payload in response to identification of the dynamic message parser; and
- a data adapter to generate a standardized data structure as a function of the message data payload in response to execution of the dynamic message parser.

5. The computing device of claim 4, wherein the binary message format comprises a binary structure definition.

6. The computing device of claim 4, wherein the message data payload is generated by a vehicle, a vehicle controller, or a sensor coupled to a vehicle.

7. The computing device of claim 4, wherein to execute the dynamic message parser comprises to (i) extract a first data item from the message data payload and (ii) determine a first label associated with the first data item.

8. The computing device of claim 7, wherein to generate the standardized data structure comprises to generate the standardized data structure that includes the first data item and the first label.

9. The computing device of claim 7, wherein:
- to execute the dynamic message parser further comprises to convert the first data item to a second data item using a predetermined data conversion operation; and
- to generate the standardized data structure comprises to generate the standardized data structure that includes the second data item and the first label.

10. The computing device of claim 4, further comprising a cloud telematics platform to process the standardized data structure.

11. The computing device of claim 10, wherein to process the standardized data structure comprises to provide the standardized data structure to a cloud application executed by the cloud telematics platform.

12. The computing device of claim 4, wherein the standardized data structure conforms to a predetermined vehicle telematics schema associated with a cloud telematics platform.

13. The computing device of claim 4, wherein the standardized data structure comprises a JavaScript object notation (JSON) format or an extensible markup language (XML) format.

14. One or more non-transitory, computer-readable storage media comprising a plurality of instructions that in response to being executed cause a computing device to:
- receive a message definition indicative of a binary message format;
- generate a dynamic message parser as a function of the message definition;
- deploy the dynamic message parser in response to generating the dynamic message parser, wherein to deploy the dynamic message parser comprises to associate the dynamic message parser with a predetermined message code;
- receive a device message from a vehicle telematics device, wherein the device message comprises an message code and a message data payload;
- identify the dynamic message parser based on comparing the message code of the device message with the predetermined message code in response to deploying the dynamic message parser;
- execute the dynamic message parser with the message data payload in response to identifying the dynamic message parser; and
- generate a standardized data structure as a function of the message data payload in response to executing the dynamic message parser.

15. The one or more non-transitory, computer-readable storage media of claim 14, wherein to execute the dynamic message parser comprises to extract a first data item from the message data payload.

16. The one or more non-transitory, computer-readable storage media of claim 15, wherein to execute the dynamic message parser further comprises to convert the first data item to a second data item using a predetermined data conversion operation.

* * * * *